United States Patent [19]

O'Donovan

[11] Patent Number: 5,960,070
[45] Date of Patent: Sep. 28, 1999

[54] PAY AS YOU COMMUNICATE CALL CENTER

[75] Inventor: John Joseph O'Donovan, Galway, Ireland

[73] Assignee: Northern Telecom Limited, Montreal, Canada

[21] Appl. No.: 08/823,632

[22] Filed: Mar. 25, 1997

[51] Int. Cl.⁶ .................................................. H04M 15/00
[52] U.S. Cl. .......................... 379/114; 379/115; 379/121; 379/265; 379/266
[58] Field of Search ..................................... 379/111, 114, 379/115, 120, 121, 133, 134, 135, 137, 138, 139, 265, 266, 309

[56] References Cited

U.S. PATENT DOCUMENTS

| | | | |
|---|---|---|---|
| 5,146,491 | 9/1992 | Silver et al. | 379/114 |
| 5,381,467 | 1/1995 | Rosinski et al. | 379/121 |
| 5,600,710 | 2/1997 | Weisser, Jr. et al. | 379/67 |
| 5,602,907 | 2/1997 | Hata et al. | 379/112 |
| 5,646,984 | 7/1997 | Oda | 379/114 |
| 5,710,807 | 1/1998 | Smith | 379/114 |
| 5,742,667 | 4/1998 | Smith | 379/114 |

FOREIGN PATENT DOCUMENTS

WO93/03000  1/1996  WIPO ........................... H04M 15/00

Primary Examiner—Curtis A. Kuntz
Assistant Examiner—Binh K. Tieu
Attorney, Agent, or Firm—Kenneth W. Bolvin; W. Glen Johnson; John D. Crane

[57] ABSTRACT

During a telephone call to a call center, in a first portion of the call is placed in a call queue, and the call center apparatus generates a pre-answer signal which is interpreted by a central office apparatus to meter and bill a cost of the call to a receiving party operating the call center. When the call is connected to an interactive device, e.g. a call center agent's telephone handset, the call center generates a call answer signal which is transmitted to the central office apparatus, and interpreted as a signal to meter and bill a second portion of the call, containing interactive communication to a caller.

5 Claims, 9 Drawing Sheets

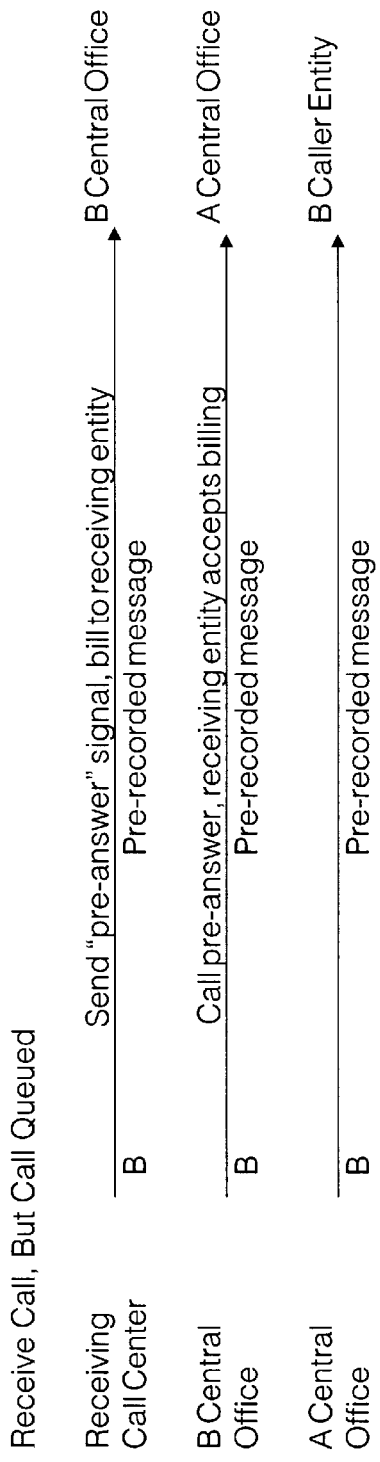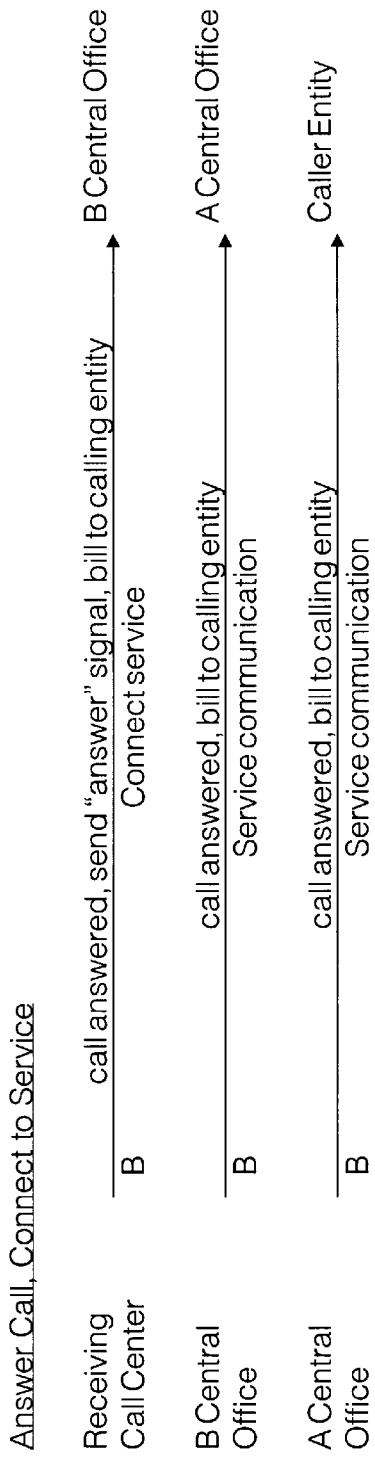

PAY AS YOU COMMUNICATE CALL CENTER

FIELD OF THE INVENTION

The invention relates to a method for determining call charges in a communications network.

INTRODUCTION

It is now common for television shows and radio shows to stage "Phone-ins" in which members of the public are invited to telephone the show organizers, giving their opinions on, or voting on various matters. Similarly, it is known for companies who wish to stage sporting or promotional events, which are advertised through television or other media, to receive telephone bookings for sports events, or responses to promotional offers from the general public. The event or program organizers may arrange to hire a call receiving center apparatus for the purpose of staging such phone-ins, in order to deal with the volume of call traffic received. The volume of calls received can be very large. For example in February 1997 in the United Kingdom the airline British Airways offered heavily discounted flights from the UK to New York on the Concorde jet aircraft in order to celebrate the airline's $50^{th}$ year in business. In this instance, over 2 million members of the public called British Airways call center facility, but only around 10,000 of those calls were actually responded to by the organizers. The actual number of flights available were only of the order of 100, and the response to this offer and the fact that many members of the public could not get through to the organizers was widely reported in the national press at the time. Thus, there are instances where the number of calls received in such a phone-in or promotional event far exceeds the capacity of the organizers call center to respond to the incoming calls.

When the caller calls the promotional or phone-in telephone number, their call is connected across the public switched telephone network (PSTN) to the call receiving center and, if unable to be responded to immediately, the call is placed in a call queue by the call receiving center. During the time the call is in the call queue, a connection exists across the network and the cost of the connection is added to the caller's phone bill. Where the number of calls exceeds the capacity of the call center as a whole, the caller may hear the engaged tone and the call is not connected, in which case the caller is not charged for the call. However, where event organizers stage phone-ins and promotions in which they expect a significant response, the organizers may lease a number of call centers, which are networked together, the network being set up specifically for the promotional event. Such networks may have a large capacity for holding received calls in a queue system. The capacity of the queue system may be much greater than the capacity of the telephone operators at the call center for answering such calls, with the result that many callers are held in queues for a long time, and may never have their calls answered by a human operator at all due to flooding of the human operators with calls. Members of the public may be calling from call boxes, mobile phones, or may be calling from abroad, thereby incurring relatively high call charges whilst waiting in the queue. Eventually, the callers become impatient and hang up their telephones.

As significant transmission resources are utilized by connection of the caller's call to the call receiving centers, the communications network operators must charge for such usage. However, although the caller has been connected to the call center and is thus receiving a communications service to a call center, for which he will be billed, the caller whose call is placed in a queue system receives no value from his connection to the call center since no significant information is being communicated across the connection. The caller is being charged for a call which effectively remains unanswered.

In U.S. Pat. No. 5,148,474, there is disclosed a method of flexible billing for a telephone call in which a billing rate of the call is varied during the duration of the call. During a first portion of the call, the caller is billed at normal rates via the telephone service company's automated billing system. During a second portion of the call, the caller is billed at increased rate, by the telephone service company's automated billing system, and payments of the value of the second portion of the call are allocated between the telephone service company and the called party. Acceptance of call charges by the caller are activated by the caller entering keystroke digits on his telephone handset in response to an automated message generated by the called party informing the caller of the rate which will apply to the call. The system disclosed on U.S. Pat. No. 5,148,474 is built around a conventional conference call facility such as presented in U.S. Pat. Nos. 4,754,478, 4,544,804, and automated billing systems as disclosed in U.S. Pat. No. 4,908,850. In U.S. Pat. No. 5,148,474, the billing method disclosed is activated as a function of a personal identification number dialed by the caller.

SUMMARY OF THE INVENTION

One object of the present invention is to provide a method and apparatus by which billing of a communications call can be apportioned between a caller and a call receiver according to a flow of service information during the communications call.

Another object of the present invention is to provide method and apparatus for billing a communications call as a function of an answering method of a dialed call.

According to a first aspect of the present invention, there is provided a communications call receiving apparatus for receiving a plurality of calls from a plurality of caller entities, said apparatus comprises means for facilitating apportionment of billing of a communications call between a caller and itself, said means comprising:

a call queue means for placing wherein said calls in a call queue;

a service provider means operable to provide a service to said caller entities; and a call handling means operable to receive said calls and to connect calls to said call queue means and said service provider means, wherein said call handling means operates to generate a first answer signal on receiving said incoming calls and generates a second answer signal on connecting said calls to said service provider means.

According to a second aspect of the present invention there is provided a method of apportioning charges for a telephone call between a caller and a receiving entity, said method comprising the steps of:

receiving an incoming call;

determining whether an interactive response is available at said call receiving entity;

if an interactive response is not available at said call receiving entity, placing said incoming call into a call queue;

sending a first answer signal indicating that a cost of said incoming call is to be charged to said receiving entity;

activating a pre-recorded message indicating that said incoming call is placed in a call queue, and a caller is not being billed for said incoming call;

if an interactive response becomes available, collecting said call from said call queue;

sending a second answer signal indicating termination of apportionment of a cost of said call to said receiving entity.

Preferably, there is provided a method further comprising the step of timing said incoming call; and if an interactive response continues to be unavailable after a predetermined time limit is exceeded, disconnecting said call.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 6 illustrates schematically B and D channel signaling between a call receiving entity, a receiving central office, a sending central office, and a call sending entity, for metering and billing information during a portion of a communication's call during which non-interactive communication takes place in accordance with a specific example of the present invention;

FIG. 7 illustrates schematically signaling between a call receiving entity, a call receiving central office, a call sending central office and a calling entity during a second portion of a communication's call during which interactive communication takes place in accordance with an example of the present invention;

DETAILED DESCRIPTION OF THE BEST MODE FOR CARRYING OUT THE INVENTION

There will now be described operation of a prior art call center, by way of background to the best mode of the present invention.

Figure 1:
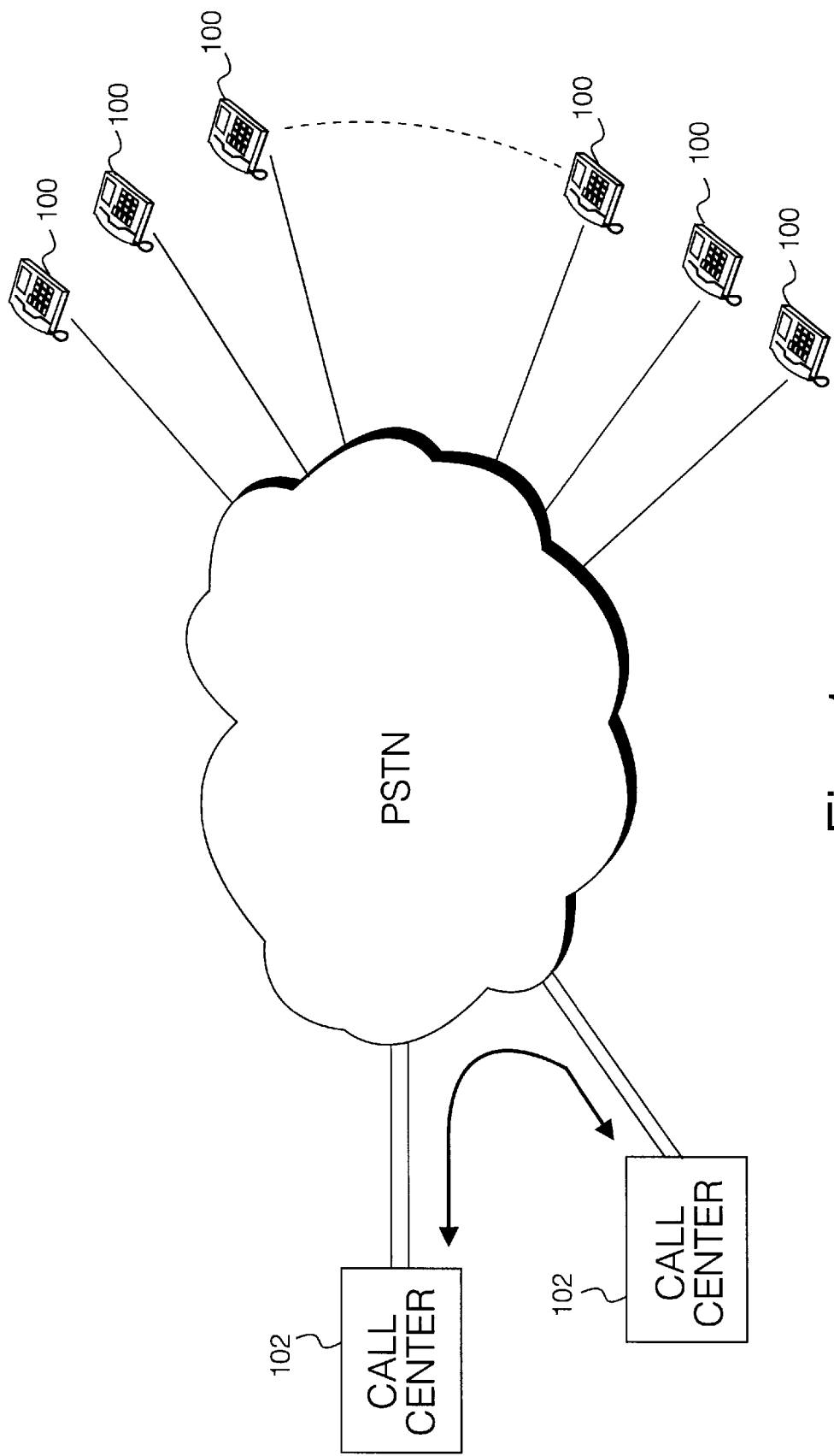
FIG. 1 illustrates a plurality of prior art callers calling a plurality of prior art call centers over a public switched telephone network (PSTN)

Referring to FIG. 1 herein, there is shown a plurality of caller entities 100, comprising individual telephone handsets, for example as operated by members of the public dialing calls to a one or a plurality of prior art call centers 102 which may be networked with each other, and which upon receipt of the calls may place the incoming calls in a central call queue system for answering by a plurality of human operators, operating telephone handset extension of the call center, known as agents.

Figure 2:
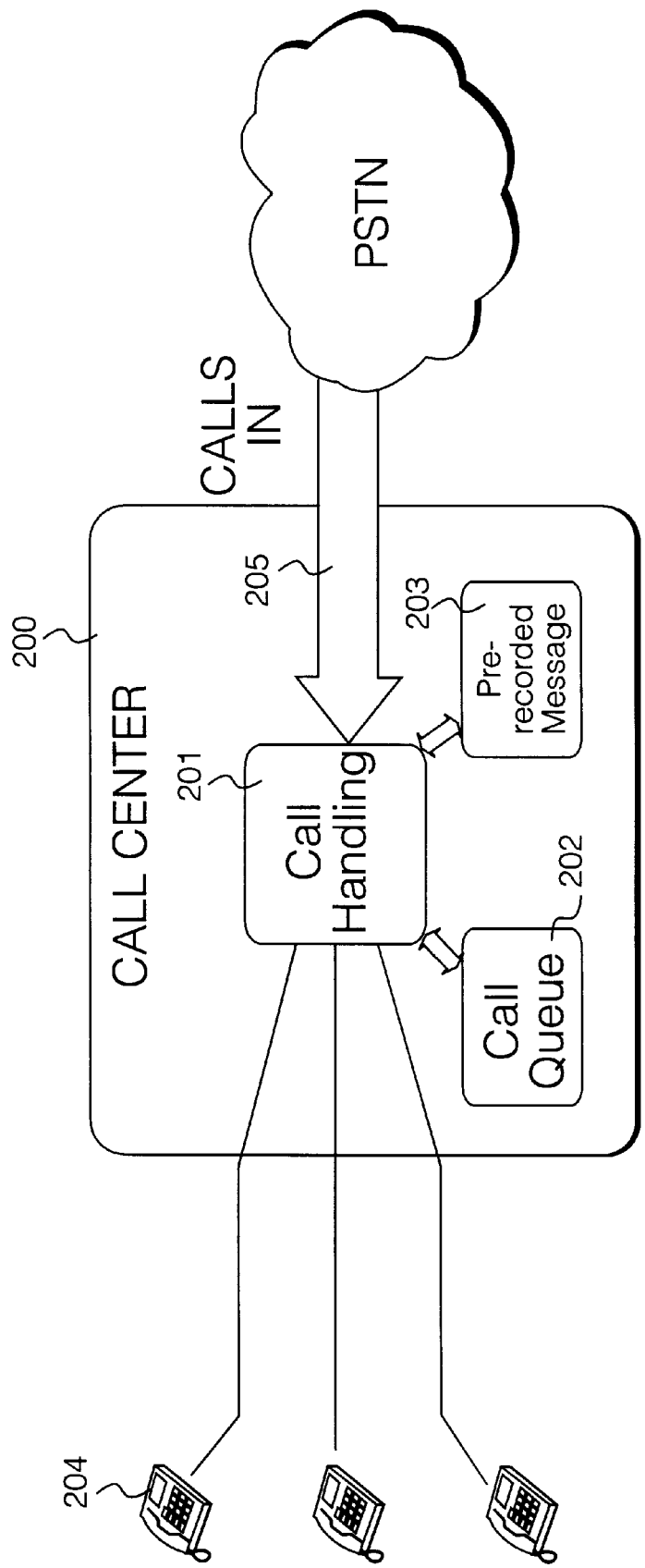
FIG. 2 illustrates a simplified architecture of a prior art call center.

Referring to FIG. 2 herein, there is shown schematically a prior art call center. The prior art call center comprises a call handling means 201 for handling a plurality of incoming calls; a call queue means 202 for placing incoming calls in a queue; a pre-recorded message generating means 203 for sending a pre-recorded message to the caller entities whilst their calls are in the queue; and a plurality of agent telephone handsets for communicating with callers whose calls are not waiting in the call queue. The prior art call center is derived from the known private branch exchange (PBX) which may for example provide an internal telephone system for a corporate user having a number of internal telephone extensions 204 connected to each other through call handling apparatus 201 in conventional manner. External lines 205 connect the call center to the public switched telephone network (PSTN). However, the conventional call center differs from the conventional private branch exchange, by having additional functionality in the form of a call queuing facility and a pre-recorded message facility for issuing a pre-recorded message to incoming calls which are queued in the call center. In the conventional call center, each telephone handset 204 has a keystroke facility for obtaining a next waiting call from the call queue means 202. Calls can be answered by the human operators at the handset extensions 204 according to predetermined criteria which are preset into the call center. Examples of such criteria include answering calls in order of arrival, answering calls of one area code in preference to calls of another area code, answering calls from pre-specified telephone numbers in preference to answering calls from other telephone numbers. An example of a prior art call center is the Meridian 1 Call Center available from Northern Telecom Limited. In the Meridian 1 Call Center, calls are received from the public switched telephone network onto a plurality of line cards which receive the incoming calls over copper wire twisted pairs or optical fiber cable. The incoming calls have the conventional signal format of a 64 Kbit/s voice channel, known as the B channel, and a 16 Kbit/s signal channel, known as the D channel. The incoming calls are routed to the extensions 204, call queue 202 or pre-recorded message means 203 by a processor card of the switch. The pre-recorded message may be recorded on a tape recorder or other voice signal storage device on a card of the switch, and call queuing is handled by a separate card or portion of a card on the switch.

Figure 3:
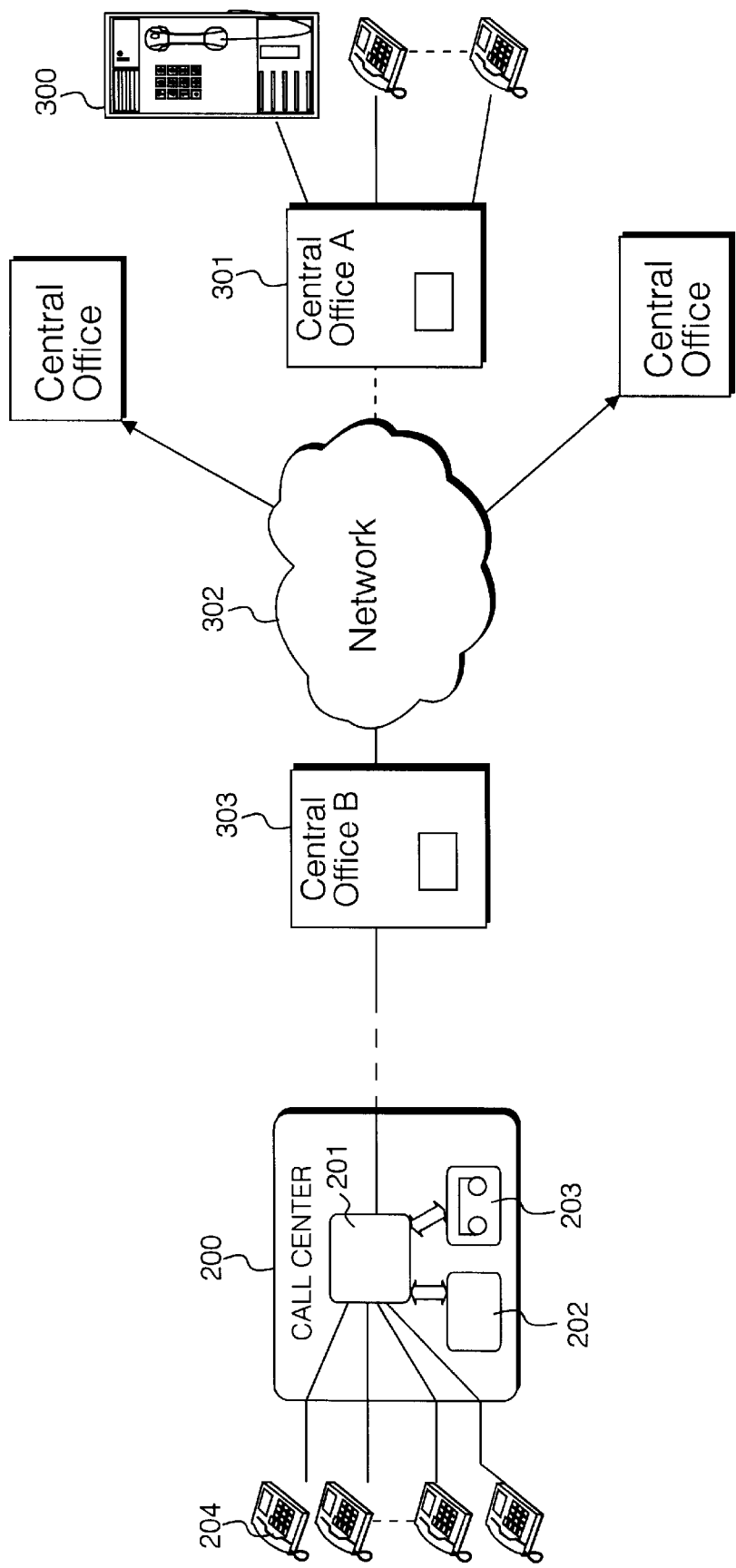
FIG. 3 illustrates a communication of a prior art caller entity with a prior art call center over a prior art communications network.

Referring to FIG. 3 herein, there is illustrated an example of events which occur when an incoming call is received by a prior art call center, and is placed in a call queue. A caller initiates a call typically from a payphone or conventional residential domestic telephone line 300. Many callers may dial incoming calls simultaneously, and the handling of one such call will now be described. The calling entity, eg payphone, residential telephone or corporate telephone system dials the call center 200 in conventional manner. Conventional call signals for setting up the connection path over conventional twisted pair wires to the local telephone exchange (known as the A Central office) to which the calling entity is connected, which may be a conventional switch 301, for example a Northern Telecom Limited DMS 10 type switch, or equivalent switches manufactured by Nippon Telephone and Telegraph of Japan, Nokia, or Ericsson. The central office 301 forwards the appropriate conventional dialing signals over the national or international telephone network 302 to a B Central office 303 associated with the call center 200 whose number is specified in the keystroke signals input at the calling entity in conventional manner. On receipt of the call a connection is created and the call handling element 201 of the receiving call center 200 returns an answer signal over the 16 Kbit/s D channel to its associated local telephone exchange, which contains the B central office 302. On receiving the D channel signal, the B central office forwards a D channel signal to the A central office of the calling entity. The A central office commences to log billing information on an account corresponding to the calling entity 300. Meanwhile, the receiving call center 200 may have either connected the calling entity to an agent 204 if one is available, or if an agent is unavailable, the call handling element 201 of the receiving call center 200 activates a pre-recorded message generated by pre-recorded message apparatus 20, which is transmitted over the 64 Kbit/s B channel to calling entity 300. Meanwhile, the call queue apparatus 202 places the call from the calling entity 300 in a queue of calls along with a plurality of other calls from a corresponding respective plurality of other calling entities. Whilst the pre-recorded message is being received by the calling entity 300, and the call queue is in operation the A central office 301 bills calling entity 300 for the cost of the connection, irrespective of the flow of information across the connection. Thus, in the prior art the calling entity 300 is billed for the call connection irrespective of whether the calling entities' call is placed in a call queue, or whether the calling entity is receiving service from an agent 204 connected to the receiving call center 200. In the prior art, the calling entity 300 is billed as soon as a connection is made, and for as long as the connection is maintained, irrespective of whether the caller receives any significant service from the operators of the receiving call center 200.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Specific methods and apparatus according to the present invention will now be described with reference to FIGS. 4, to 11 herein.

Figure 4:
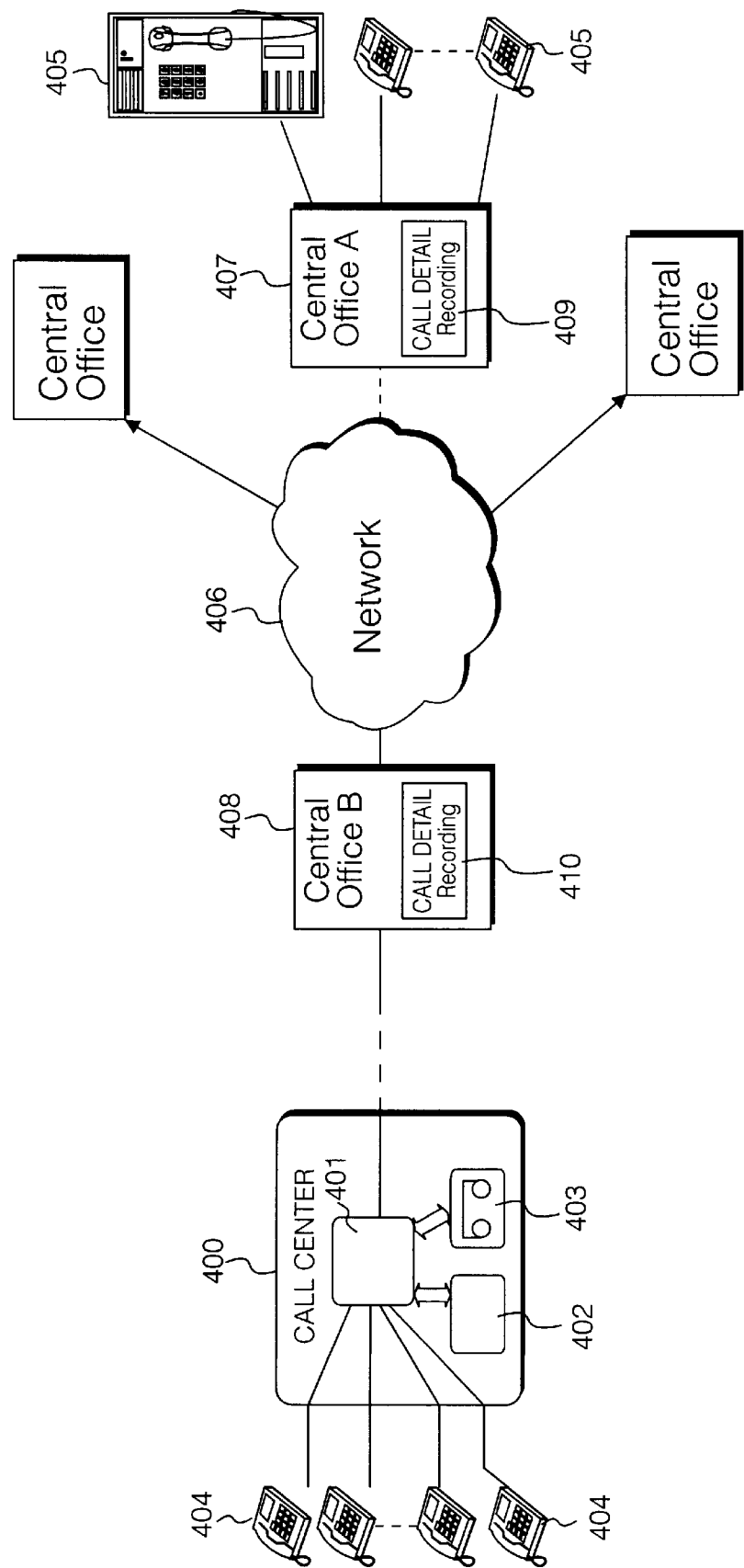
FIG. 4 illustrates an improved call center apparatus and central office apparatus operating specific methods and processes according to the present invention.

Referring to FIG. 4 of the accompanying drawings, receiving call center 400 comprises a call handling means 401, a call queue means 402, a pre-recorded message means 403 and one or a plurality of service providing means 404. The service providing means comprises agent telephone handsets, in the best mode herein, which can be operated by a plurality of human operators for receiving incoming calls. However the service providers are not restricted to such human operators but could comprise an interactive service device. A plurality of incoming calls originating from a plurality of caller entities 405 are transmitted across a communications network 406 via a plurality of sending A central offices 407 which receive the calls from the caller entity, and which route the calls across the network to one or a plurality of receiving B central offices 408 which route the incoming calls to one or a plurality of the receiving call centers 400. Where a plurality of receiving call centers are used, these may be networked together to provide a common call queue. The sending and receiving central offices 407, 408 each comprise a respective billing entity 409, 410 known as call detail recording means, which records details of a call such as the number dialed, the duration of the call, the billing rate of the call, the telephone number and corresponding customer to whom the call is to be billed. Call sending A central office 407 and call receiving B central office 408 are each modified for implementation of general method and data processing steps as hereinafter described.

It will be understood by the person skilled in the art that in practice the call center 400, and central office apparatus 407, 408 are highly complex pieces of apparatus. Functionality of the call center and central office apparatus is controlled by one or more processors per call center or central office, for example an Intel 486 DX processor, Intel Pentium® Processor or equivalent may be used in the case of the call center apparatus 400, controlled in accordance with control signals stored in a data storage medium. The exact configuration of processor and control signals is dependent upon the manufacturer and model type of call center and central office apparatus. For example in the Meridian 1 Call Center available from Northern Telecom Limited, a plurality of Intel processors are controlled by control signals stored in a data storage medium, the control signals implemented in the form of a device specific programming language known all as SL1. However, the control signals could equally be implemented in a common programming language, such as C or C++. In the best mode herein, the functionality for implementing the methods and data processing steps hereinafter described are best implemented by altering individual lines of code in the programming comprising the control signals stored in the data storage medium of the Northern Telecom Limited Meridian 1 Call Center and DMS 10, or DMS 100 or similar switch. The person skilled in the art will appreciate that although the following methods and processing steps may be implemented by relatively few lines of code, for example in the SL1 language by changing of the order 50 to 300 individual lines of code, in a product such as the Meridian 1 Call Center or the DMS 10 switch, the overall control of the call center or switch is implemented through control signals comprising around 10 million lines of code, and any changes to the code are tightly regulated and strictly controlled. Thus, the following methods and processes may be implemented as part of a general upgrade release of the Meridian 1 and DMS products, which generally appear over a time scale of one or two years. It will also be appreciated to the person skilled in the art that the methods and processes described hereinafter can be implemented by the person skilled in the art in different device specific ways for modifying different manufacturer's proprietary call center and switch products.

Figure 5:
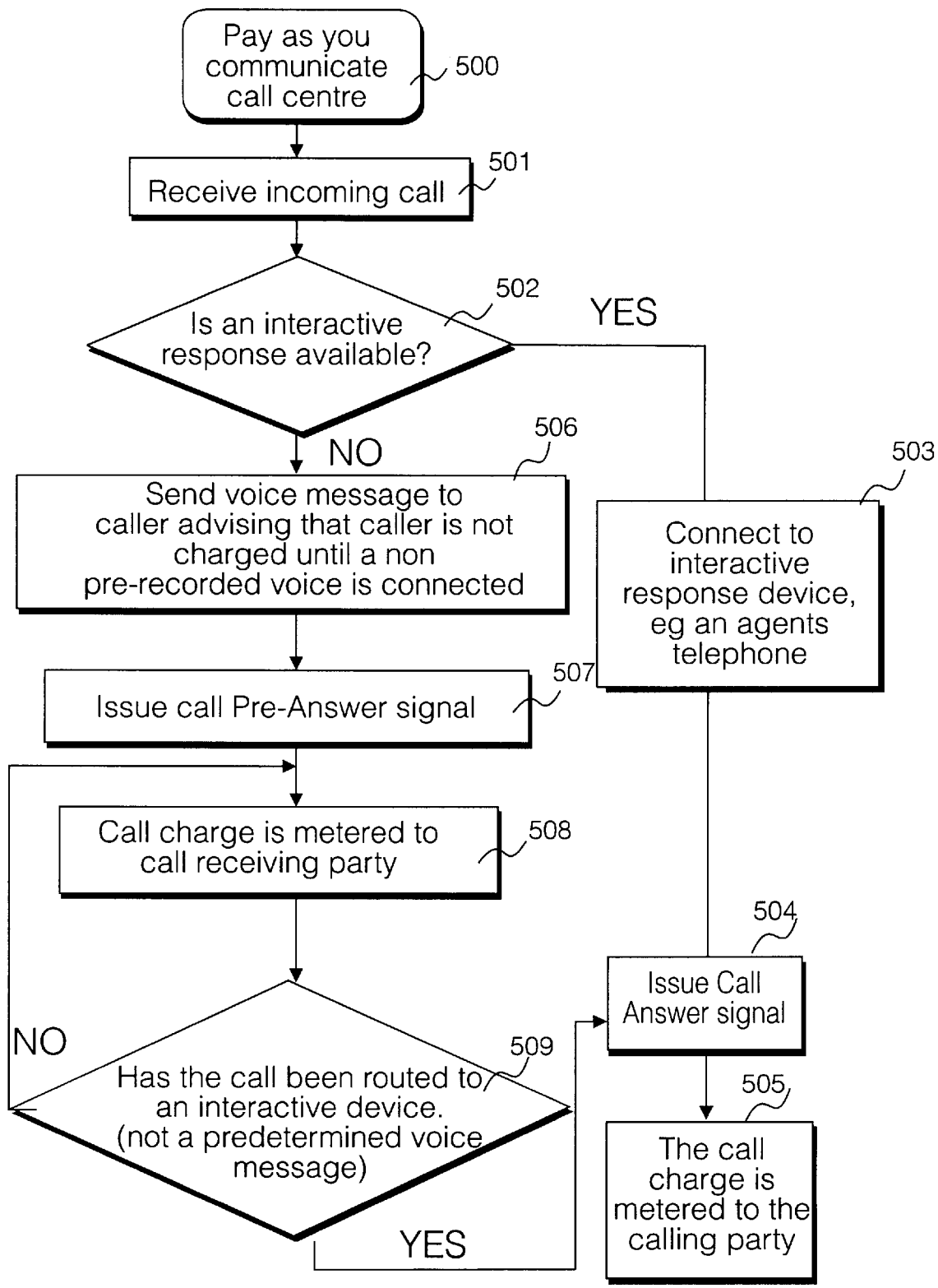
FIG. 5 illustrates in general a method of determining charges for a communications call according to a best mode of the present invention.

Referring to FIGS. 4 to 6 herein, a user of calling entity 405 eg a conventional payphone or domestic telephone handset apparatus initiates a call in conventional manner by picking up a telephone handset and dialing a telephone number. At the local telephone exchange, call sending (A) central office apparatus 407 transmits the appropriate conventional D channel signal over the national or international telephone network 406 to the local telephone exchange containing call receiving (B) central office apparatus 408 to which the receiving call center 400 is connected. Receiving call center 400 receives the D channel signal, and call handling element 401 of receiving call center 400 accepts the call in step 501. The call handling element 401 operates to determine whether an interactive response device, for example an agent's telephone handset 404 is immediately available to deal with the incoming call, in step 502. If an interactive response device is available at the receiving call center 400, the call handling element 401 connects the call to the interactive response device, eg agent's telephone handset 404 in step 503 and in step 504 the call is billed to the calling entity in conventional manner. That is to say the receiving call center 400 generates a "call answer" signal which is transmitted to the call receiving (B) central office 408, which sends a signal to the call sending (A) central office 407 which then implements the appropriate updating of the call detail recording means 409 corresponding to the calling entity 405, so that the call is metered and billed to calling entity 405 in step 505.

However, if in step 502, call handling element 401 determines that there are no interactive response devices immediately available, eg if all agent's handsets are busy, then in step 506 call handling element 401 places the incoming call in call queue apparatus 402, call center 400 activates pre-recorded message means 403, which issues a pre-recorded voice message over the 64 Kbit/s B signal channel of the call in step 506. Such a message may tell a caller that they are in a call queue system, and are not being billed for the call. In step 507, call handling element 401 issues a first answer signal (a "pre-answer" signal) over 16 K/bits D channel which is received by call receiving (B) central office 408. Call detail recording 410 of receiving (B) central office 408 interprets the pre-answer signal as a message to meter the call between calling entity 405 and receiving call center 400, and to update the call details corresponding to receiving call center 400 for billing the cost of the call to call receiving center 400. As long as the receiving call center is connected to calling entity 405, but the call is held in a queue, the call is metered and charged to the receiving call center 400 in step 508. Call handling element 401 continues to monitor interactive devices 404 in step 509, and when an interactive device becomes available and collects the call from the call queue, call handling element 401 issues a second answer signal (a "call answer" signal) in step 504 over the 16 Kbit/s B channel, which is received by call receiving (B) central office 408. Upon receipt of the "call answer" signal, call detail recording element 410 of receiving central office 408 ceases to meter the call to receiving call center 400, and transmits a message signal to call sending (A) central office 407, which interprets the message to meter the call to calling entity 405. Thus, the first portion of the call, during which the call is held in a call queue and during which no service information useful to the user of calling entity 405 is transmitted over the 64 Kbit/s B channel, the cost of the call is metered and billed to the called party operating receiving call center 400. However, once receiving call center 400 commences sending useful service information eg interactive voice communications over 64 Kbit/s B channel to the caller, a "call answer" signal is generated by receiving call center 400 which is interpreted by sending and receiving central offices 407, 408 respectively as a signal to meter and bill the second portion of the call to the calling entity 405.

Transmission of signals between the receiving (B) central office, sending (A) central office, and a calling entity during a first portion of a call in which the call is queued are summarized in FIG. 6 herein. If the call is placed in a queue by the receiving call center, a "call pre-answer" signal is issued and transmitted to the receiving (B) central office over the 16 Kbit/s D channel, and a pre-recorded message generated by pre-recorded message means 403 is sent over the 64 Kbit/s B signal channel. Once the receiving call center connects the call to a service, ie giving useful information to the caller, such as an interactive voice communication, call handling element 401 generates a "call answer" signal which is transmitted across the 16 Kbit/s D channel to the receiving (B) central office. The receiving (B) central office interprets this "call answer" signal as an instructions to bill the caller entity, and generates an appropriate signal to the sending (A) central office to this effect. The sending (A) central office implements metering and billing of the call to the calling party. Meanwhile, the receiving (B) central office 408 ceases to meter and bill the call to the receiving party. Thus, a first portion of the call may be metered and billed to a receiving party, whilst the call is placed in a call queue and a pre-recorded message is sent, whilst upon answering the call with an interactive device, during a second portion of the call, metering and billing of the call is made to the calling party.

Figure 8:
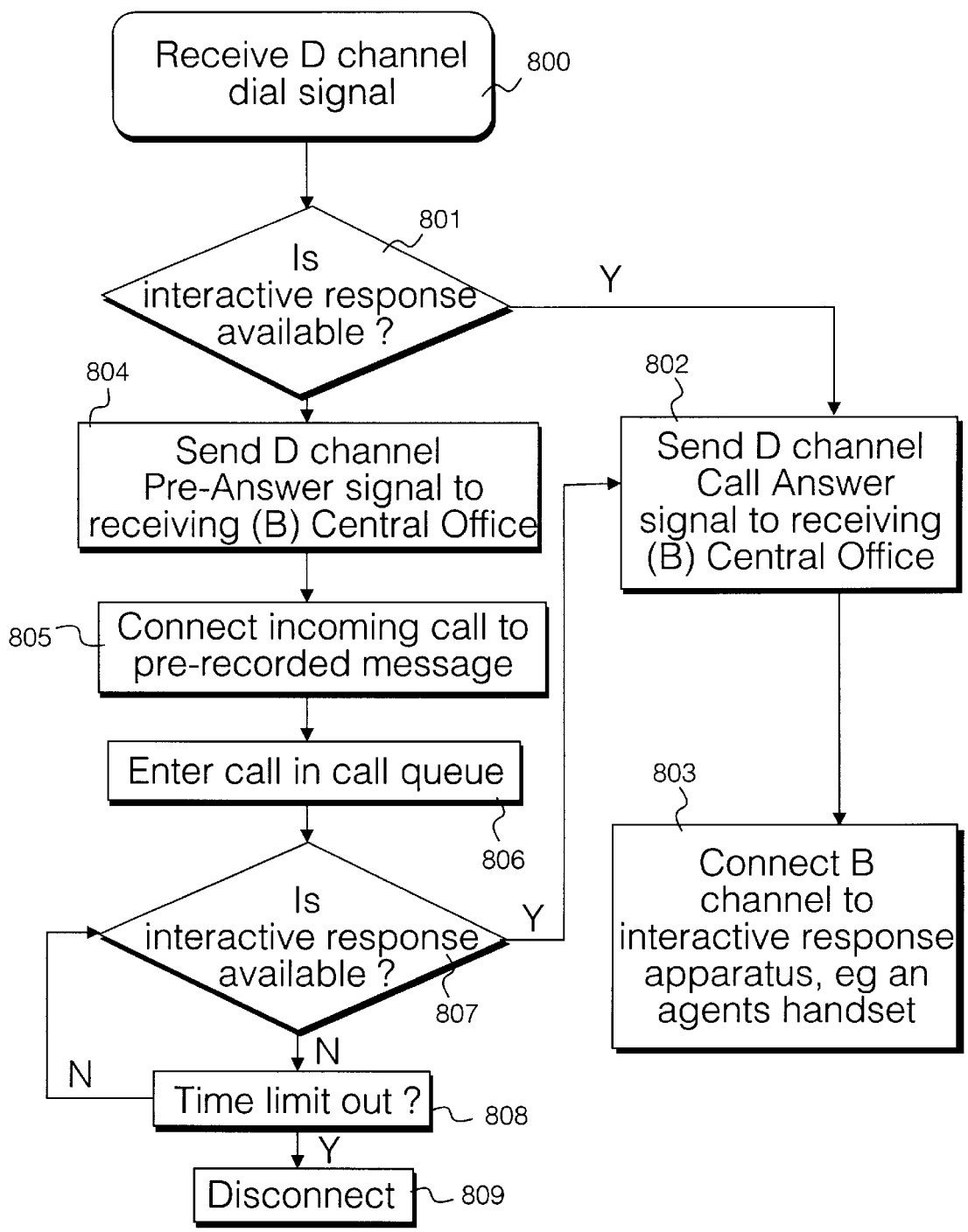
FIG. 8 illustrates schematically data processing and signaling steps implemented by a call receiving entity upon receipt of a call, wherein the call comprises an non-interactive communications portion and an interactive communications portion in accordance with an example of the present invention.

Referring to FIG. 8 herein, there are illustrated data processing steps implemented at the call center 400 upon receipt of a conventional D channel signal from a caller in step 800. In step 801, a call center determines whether an interactive response device is available to deal with the call. If an interactive response device is available to deal with the call, in step 802 the call center sends a D channel "call answer" signal to the receiving (B) central office which relays the "call answer" signal to the sending (A) central office, which implements metering and billing to the calling party. The call center connects the B channel to the interactive device, e.g. an agent's handset, and interactive communication between the caller and the agent is billed to the caller entity.

However, in step 801 if the call center determines that an interactive response device is not available, call center 400 sends a D channel pre-answer signal to the receiving (B) central office in step 804 and proceeds in step 805 to connect the incoming call to pre-recorded message element 403, for sending a pre-recorded message over the B channel, and enters the call in a call queue in step 806, handled by call queue element 402. The call center continuously monitors whether any interactive devices are available in step 807. The call center may time the call in step 808 and if interactive response devices continue to be unavailable a predetermined time limited is exceeded, call handling means 401 may disconnect the caller in step 809 to avoid the called party running up an excessive bill. However, if an interactive response device becomes available before the call is disconnected, the call center proceeds in step 802 to send a D channel "call answer" signal to the receiving (B) central office and the call center connects the 64 Kbit/s B channel to the interactive response device, to connect interactive communication between the caller and the interactive device, e.g. agent 404.

Figure 9:
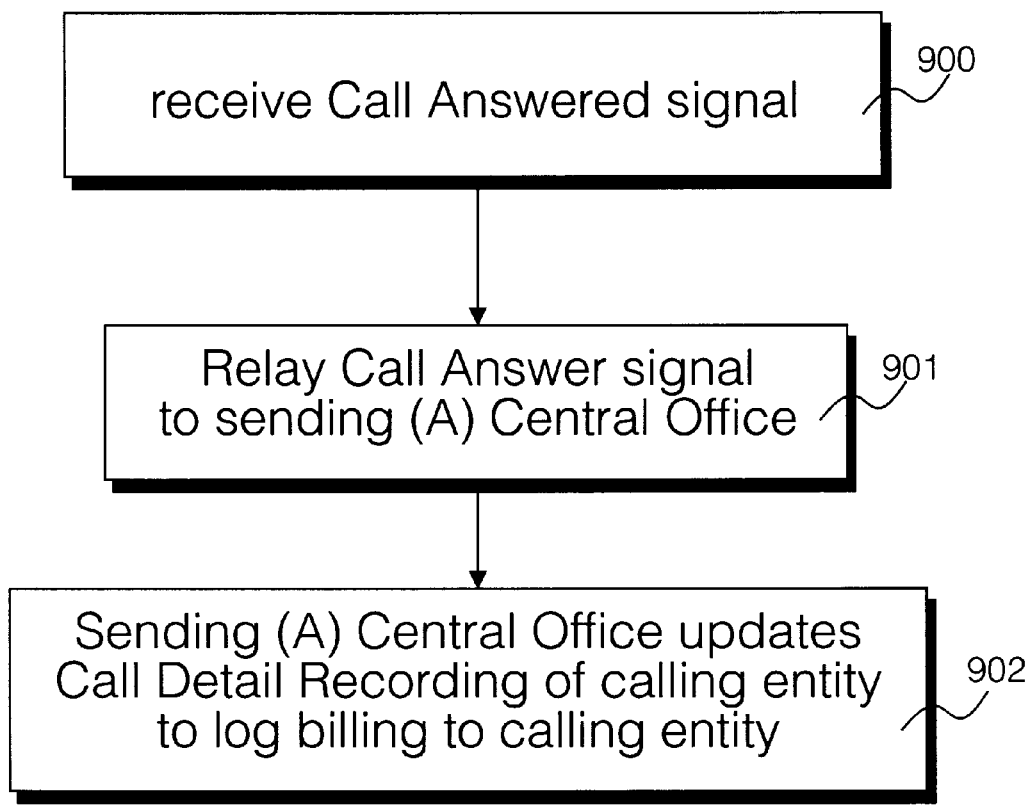
FIG. 9 illustrates herein a general method of operation of a central office apparatus upon receipt of a signal indicating an interactive communication's call in accordance with an example of the present invention.

Referring to FIG. 9 herein, there is shown schematically basics steps implemented by receiving (B) central office upon a receipt of a "call answer" signal from the call center. In step 901 the receiving central office relays the "call answer" signal to the sending (A) central office. In step 902, the sending (A) central office updates the call detail recording corresponding to the calling entity, and meters billing of the call to the calling entity.

Figure 10:
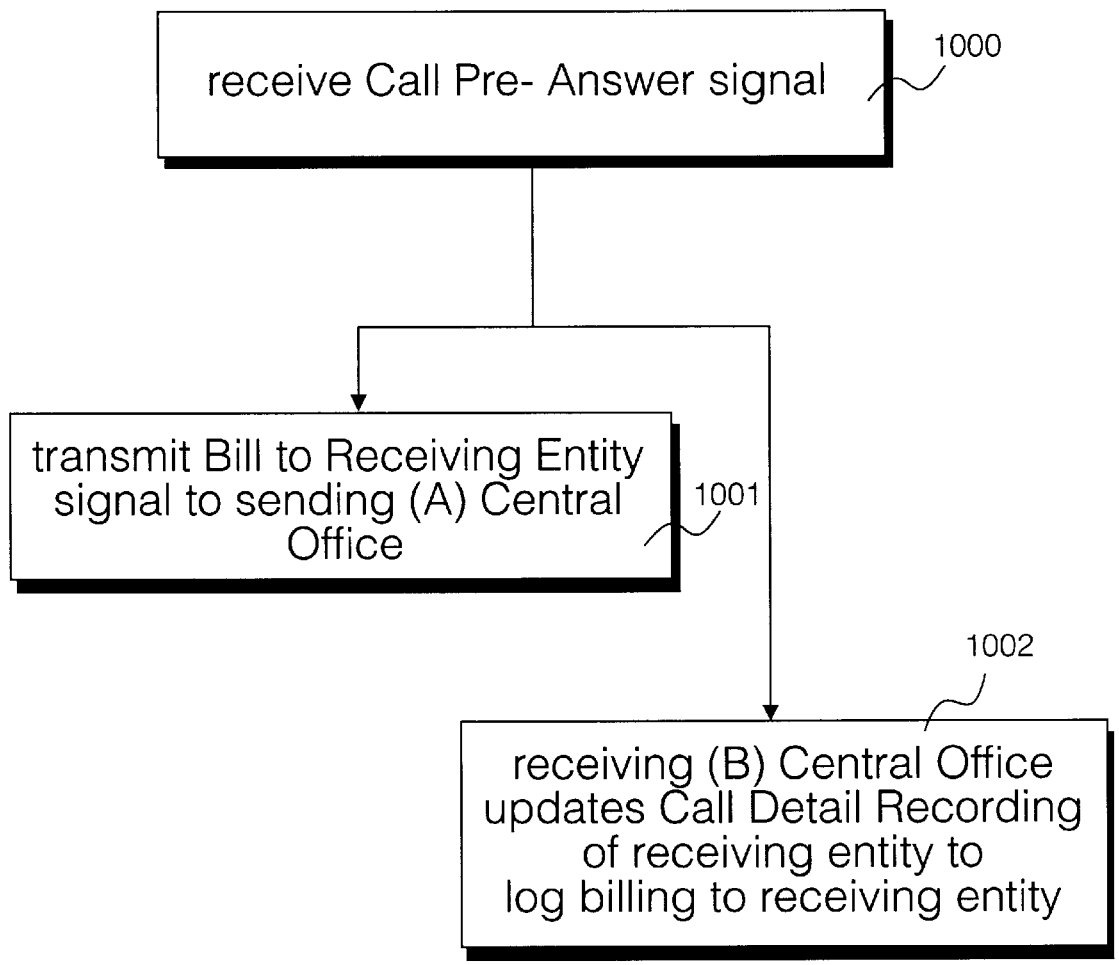
FIG. 10 herein illustrates a general method of operation of a central office apparatus upon receipt of a pre-answer signal indicating a non-interactive portion of a communications call in accordance with an example of the present invention.

Referring herein to FIG. 10, there is illustrated operation of the sending and receiving central offices upon receipt of a "call pre-answer" signal in step 1000 by the receiving (B) central office. In step 1101, receiving (B) central office transmits a "bill to receiving entity" signal to sending (A) central office over 16 Kbit/s D channel which the billing entity 409 of the (A) central office interprets that the receiving (B) central office billing entity 410 is metering the call. The sending (A) central office interprets this signal that the call is connected, however takes no action for metering and billing the call to the calling entity 405. In step 1002, the receiving (B) central office updates its call detail recording element 410 corresponding to the receiving call center 400 and meters and bills the cost of the call to the receiving call center 400.

| Abbreviations | |
|---|---|
| PBX | Private Branch Exchange |
| PSTN | Public Switched Telephone Network |
| Kbit/s | Kilobits per second |

I claim:

1. A communications call receiving apparatus for receiving a plurality of calls from a plurality of caller entities, wherein said apparatus comprises means for facilitating apportionment of billing of a communications call between a caller and itself, said means comprising:

a call queue means for placing said calls in a call queue;

a service provider means operable to provide a service to said caller entities; and a call handling means operable to receive said calls and to connect calls to said call queue means and said service provider means, wherein said call handling means operate a first answer signal on receiving said incoming calls indicating that a cost of said incoming call is to be charged to said receiving apparatus and generates a second answer signal on connecting said calls to said service provider means indicating termination of apportionment of a cost of said call to said receiving apparatus.

2. A method of apportioning charges for a telephone call between a caller and a receiving entity, said method comprising the steps of:

receiving an incoming call;

determining whether an interactive response is available at said call receiving entity;

if an interactive response is not available at said call receiving entity, placing said incoming call into a call queue;

sending a first answer signal indicating that a cost of said incoming call is to be charged to said receiving entity;

activating a pre-recorded message indicating that said incoming call is placed in a call queue, and a caller is not being billed for said incoming call;

if an interactive response becomes available, collecting said call from said call queue;

sending a second answer signal indicating termination of apportionment of a cost of said call to said receiving entity.

3. A method as claimed in claim 2, further comprising the step of timing said incoming call; and if an interactive response continues to be unavailable after a predetermined time limit is exceeded, disconnecting said call.

4. A call center operating the method as claimed in claim 2.

5. In a communications call receiving apparatus for receiving a plurality of calls from a plurality of caller entities, a method for facilitating apportionment of billing of a communications call between a caller and said call receiving apparatus, said method comprising the steps of:

providing a call queue for placing said calls in;

providing a service provider means operable to provide a service to said caller entities; and providing a call handling means operable to receive said calls and to connect calls to said call queue means and said service provider means, wherein said call handling means is operable to generate a first answer signal on receiving said incoming calls indicating that a cost of said incoming call is to be charged to said receiving apparatus and to generate a second answer signal on connecting said calls to said service provider means indicating termination of apportionment of a cost of said call to said receiving apparatus.

* * * * *